United States Patent [19]
Nishikawa

[11] Patent Number: 5,724,443
[45] Date of Patent: Mar. 3, 1998

[54] COLOR IMAGE FORMING APPARATUS

[75] Inventor: Yoshiaki Nishikawa, Yokohama, Japan

[73] Assignee: Ricoh Company, Ltd., Tokyo, Japan

[21] Appl. No.: 511,189

[22] Filed: Aug. 4, 1995

[30] Foreign Application Priority Data

Aug. 31, 1994 [JP] Japan .................................. 6-207530

[51] Int. Cl.$^6$ ...................................................... G03F 3/08
[52] U.S. Cl. ............................ 382/167; 358/518; 358/523
[58] Field of Search ......................... 358/518, 520, 358/523, 534, 515, 519, 535, 530, 504; 382/166, 167; 395/131, 109

[56] References Cited

U.S. PATENT DOCUMENTS

| | | | |
|---|---|---|---|
| 4,719,516 | 1/1988 | Nagashima | 358/444 |
| 4,758,885 | 7/1988 | Sasaki et al. | 358/520 |
| 5,317,426 | 5/1994 | Hoshino | 358/518 |
| 5,398,120 | 3/1995 | Friedman et al. | 358/520 |
| 5,448,379 | 9/1995 | Ishihara et al. | 358/504 |
| 5,463,480 | 10/1995 | MacDonald et al. | 358/518 |
| 5,481,380 | 1/1996 | Bestmann | 358/518 |
| 5,502,580 | 3/1996 | Yoda et al. | 358/523 |
| 5,519,515 | 5/1996 | Komatsu | 358/518 |
| 5,539,540 | 7/1996 | Spaulding et al. | 358/520 |
| 5,541,742 | 7/1996 | Imao et al. | 358/520 |

*Primary Examiner*—Edward L. Coles, Sr.
*Assistant Examiner*—Fan Lee
*Attorney, Agent, or Firm*—Oblon, Spivak, McClelland, Maier & Neustadt, P.C.

[57] ABSTRACT

In a color image forming apparatus, a color document read by image inputting means is converted to RGB data and then to L*a*b* data. The L*a*b* data are subjected to image processing and then transformed to RGB data. Further, the RGB data are transformed to YMCK data. Image outputting means sequentially superposes color materials on a paper on the basis of the YMCK data, thereby reproducing the color document. Recognizing means recognizes a color rendering range for the L*a*b* data and a color reproducible range available with the outputting means. Data representative of the color rendering ranges of the inputting means and outputting means are stored in a data storage and supplied to the recognizing means.

5 Claims, 24 Drawing Sheets

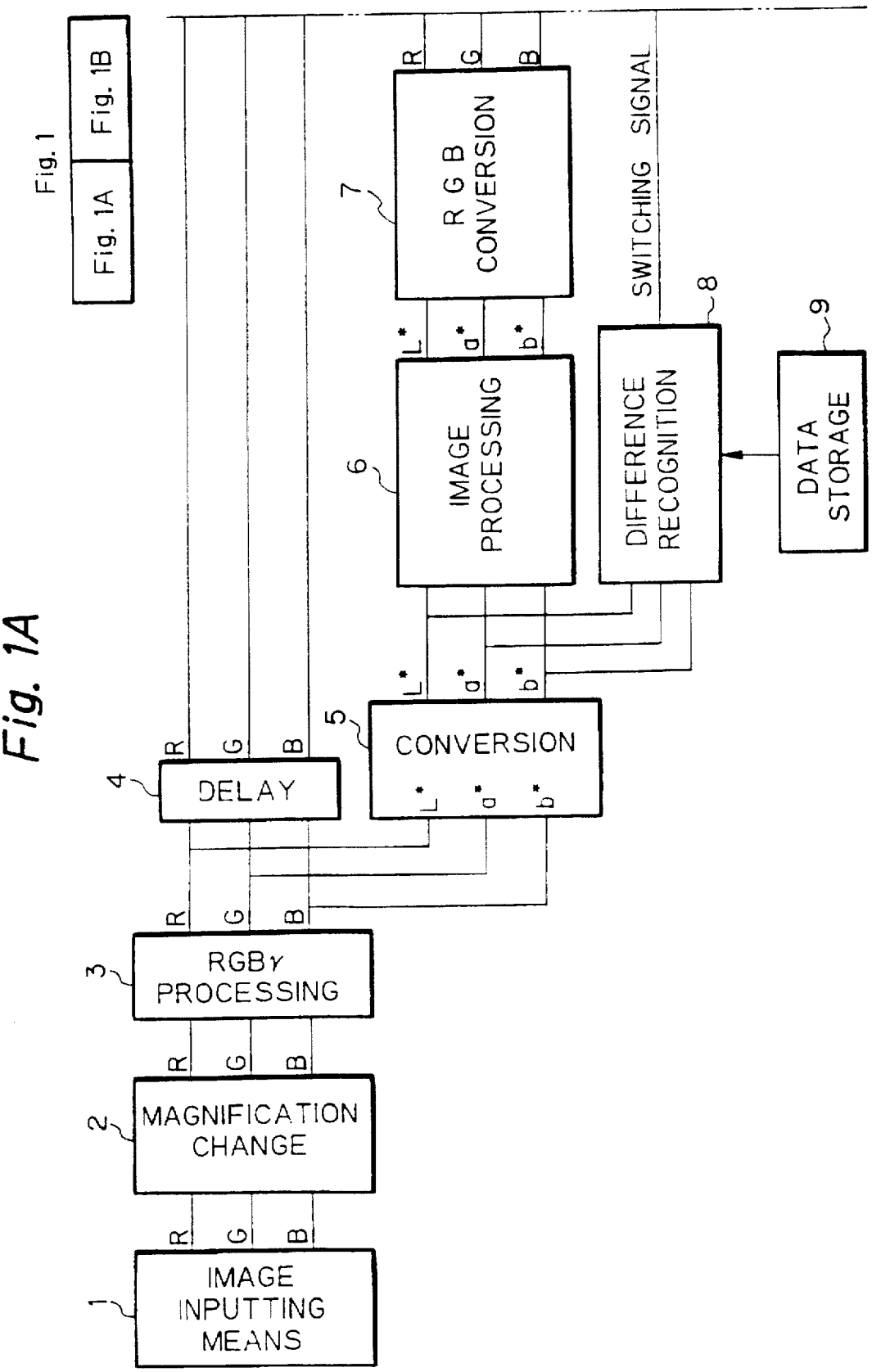

Fig. 2A
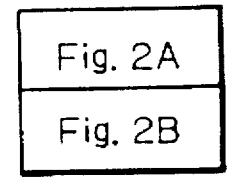
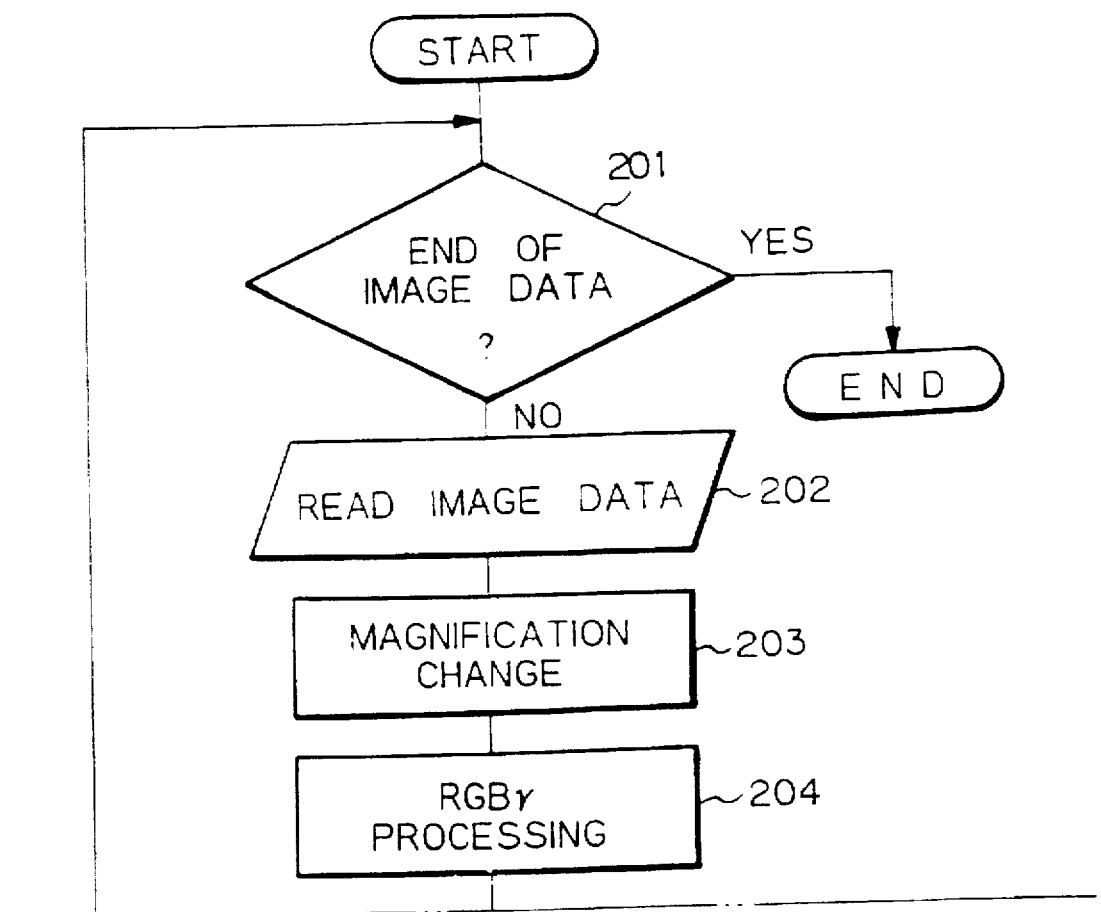

Fig. 5A

CONVERSION FROM RGB COLOR SPACE TO XYZ COLOR SPACE $$\begin{pmatrix} X \\ Y \\ Z \end{pmatrix} = \begin{pmatrix} 2.76890 & 1.75173 & 1.13020 \\ 1.00000 & 4.59070 & 0.06010 \\ 0.00000 & 0.05650 & 5.59430 \end{pmatrix} \begin{pmatrix} R \\ G \\ B \end{pmatrix}$$

Fig. 5B

CONVERSION FROM XYZ COLOR SPACE TO $L^*a^*b^*$ $$L^* = 116 \, (Y/Y_n)^{1/3} - 16$$

$$a^* = 500 \, \{(X/X_n)^{1/3} - (Y/Y_n)^{1/3}\}$$

$$b^* = 200 \, \{(Y/Y_n)^{1/3} - (Z/Z_n)^{1/3}\}$$

NOTE: $X_n$, $Z_n$ AND $Y_n$ ARE CONSTANTS DETERMINED BY STANDARD LIGHT FOR ILLUMINATION

Fig. 7

DATA REPRESENTATIVE OF DIFFERENCE SPACE ($L^*a^*b^*$)

$L^*=50$

| $a^*$ | $b^*$ | | |
|---|---|---|---|
| 0.0 ~ 0.9 | 98.0 | ~ | 149.5 |
| 1.0 ~ 1.9 | 97.8 | ~ | 149.1 |
| 2.0 ~ 2.9 | 95.4 | ~ | 148.8 |
| 3.0 ~ 3.9 | 95.0 | ~ | 147.6 |
| 4.0 ~ 4.9 | 94.9 | ~ | 147.1 |
| ⋮ | ⋮ | | |
| 148.0 ~ 148.9 | 0.0 | ~ | 0.0 |
| 149.0 ~ 149.9 | 0.0 | ~ | 0.0 |

(DOWN TO 1ST DECIMAL PLACE)

$$\begin{pmatrix} Y \\ M \\ C \\ K \end{pmatrix} = \begin{pmatrix} a11 & a12 & a13 \\ a21 & a22 & a23 \\ a31 & a32 & a33 \\ a41 & a42 & a43 \end{pmatrix} \begin{pmatrix} R \\ G \\ B \end{pmatrix} + \begin{pmatrix} a14 \\ a24 \\ a34 \\ a44 \end{pmatrix}$$

a11 ~ a44: MASKING COEFFICIENTS (USED CORRECT DEVIATION FROM ACTUAL DATA AND THEREBY APPROXIMATE ACTUAL CHARACTERISTIC TO IDEAL CHARACTERISTIC)

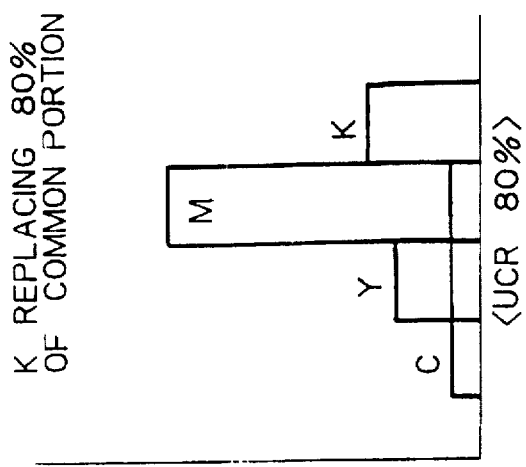
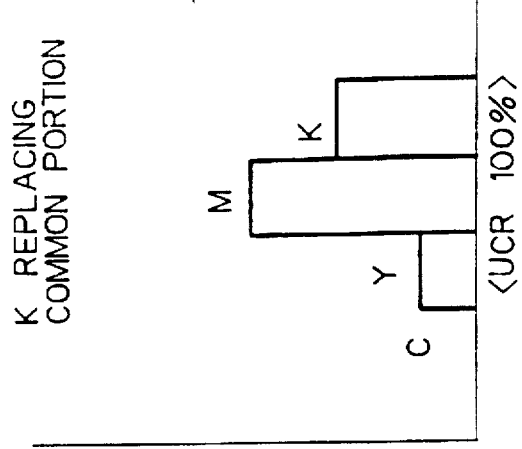
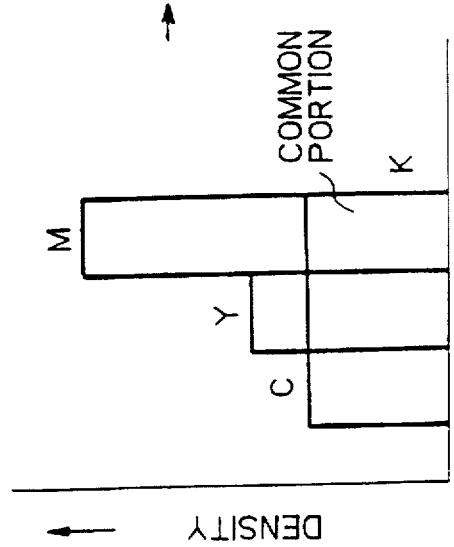

FIG.15A
COLOR RENDERING RANGE
OF IMAGE INPUTTING MEANS
FIG.15B
COLOR RENDERING RANGE OF
IMAGE OUTPUTTING MEANS
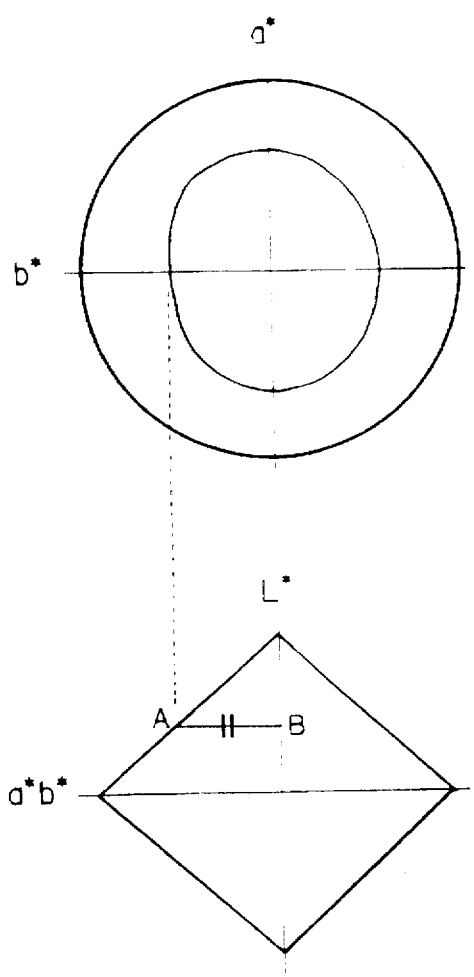
FIG.15C
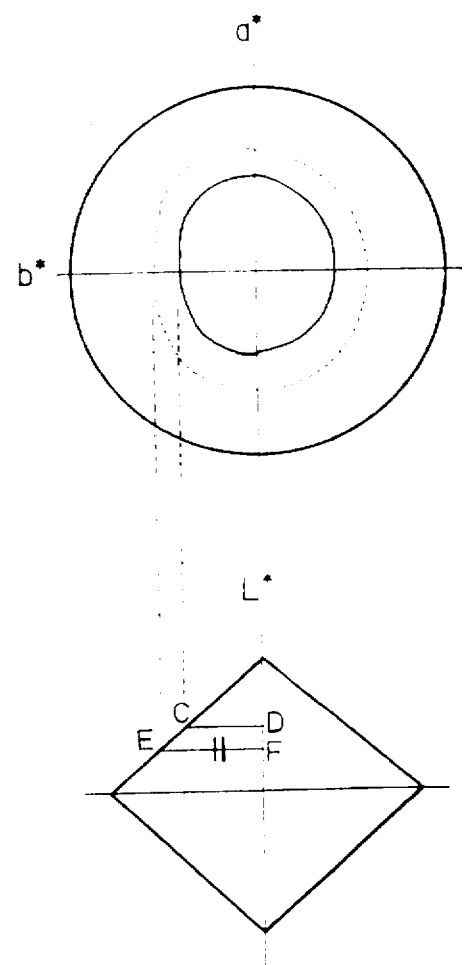
FIG.15D Fig. 20
(I)　　　　　　(II)　　　　　　(III)
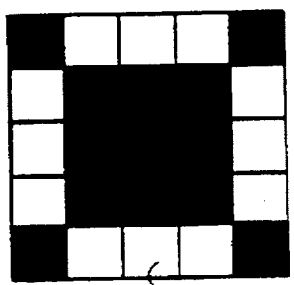 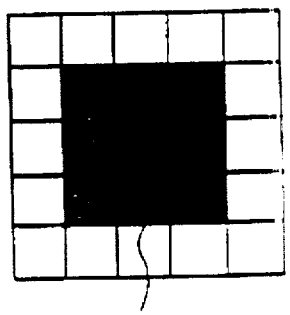 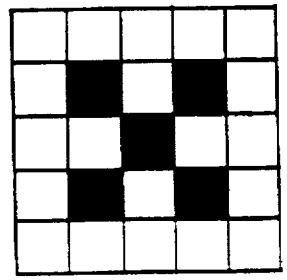
　WHITE DATA　　CONVERTED
　　　　　　　　IMAGE DATA
(IV)　　　　　　(V)　　　　　　(VI)
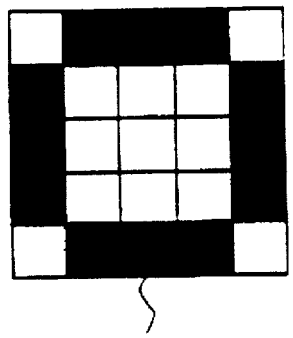 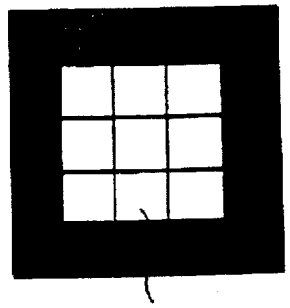 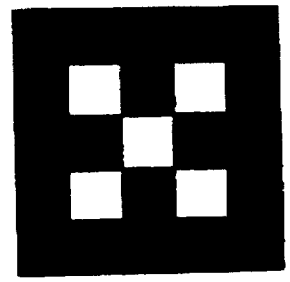
　BLACK DATA　　CONVERTED
　　　　　　　　IMAGE DATA

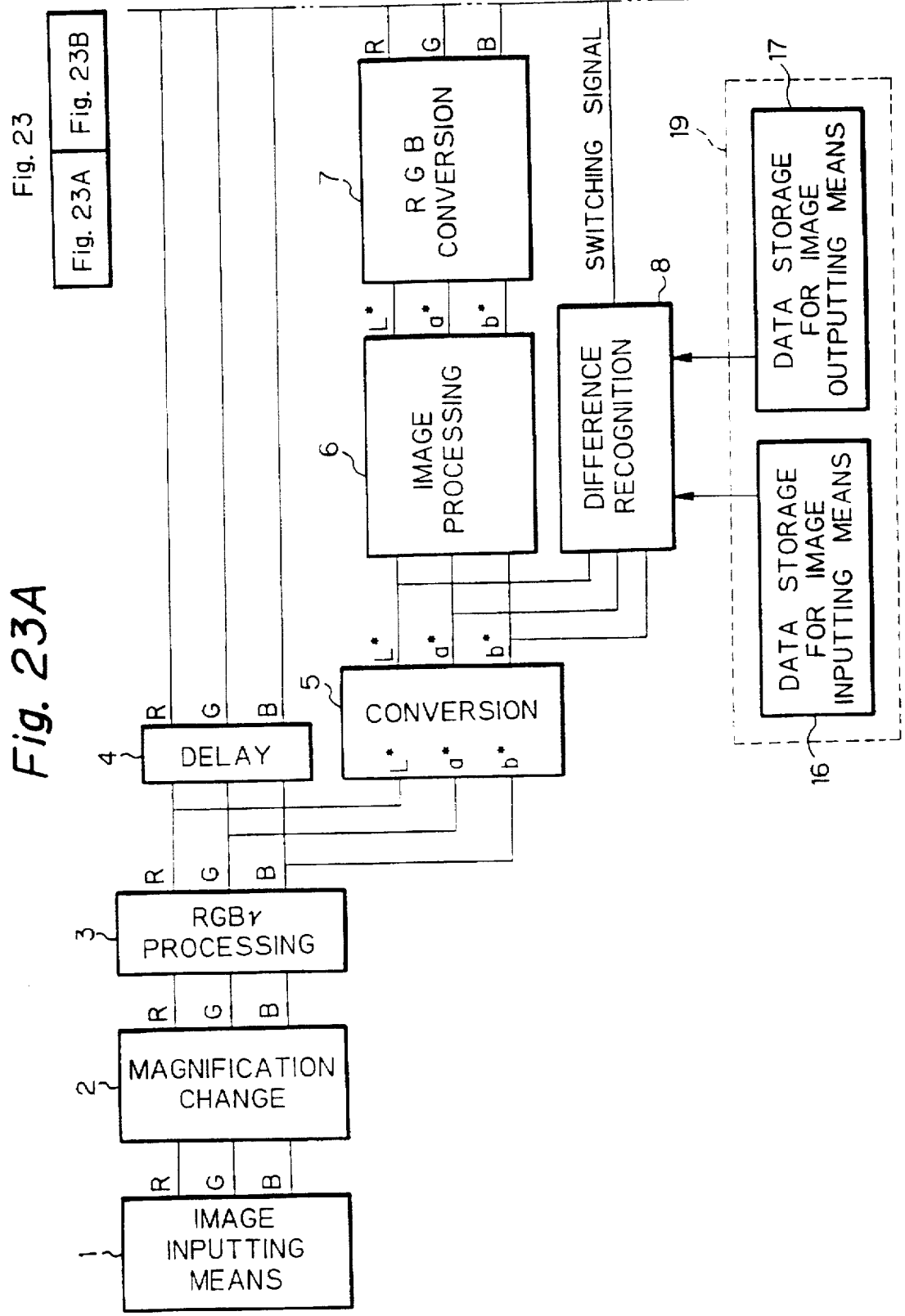

COLOR IMAGE FORMING APPARATUS

BACKGROUND OF THE INVENTION

The present invention relates to a color image forming apparatus capable of forming a color image without deteriorating the tonality of an original color image.

It is a common practice with a color image forming apparatus to process input image data representative of a color document digitally. This type of apparatus is required to read the color document by separating it into RGB (red, green and blue) components, and then transform them to an L*a*b* color space; L* is representative of lightness while a*b* are representative of hue and saturation. The input image can be directly output if the color reproduction range of an output image is the same as or broader than that of the input image. When the color reproduction range of the output image is narrower than that of the input image, the input image is output after its color reproduction range has been compressed. For the transform of the RGB components to the L*a*b* color space, it has been customary to compress the color reproduction range of the input image without regard to the relation between it and the color reproduction range of the output image, thereby implementing tonality available with a color reproduction range narrower than that of the output image.

As stated above, the color reproduction range has heretofore been compressed both when the reproduction range of the output image is the same as that of the input image and when the former is broader than the latter. This, however, causes the color balance of the original image to be lost and results in an image having discontinuous low tonality.

SUMMARY OF THE INVENTION

It is, therefore, an object of the present invention to provide a color image forming apparatus capable of protecting tonality from deterioration.

A color image forming apparatus of the present invention has an image inputting section for reading a color document image and generating RGB data representative of the document image. An L*a*b* converting section converts the RGB data to L*a*b* data. An image processing section executes image processing with the L*a*b* data. An RGB converting section converts data output from the image processing means to RGB data. A YMCK processing section converts the RGB data to YMCK data. An image outputting section outputs the color document image by sequentially superposing color materials on a paper in response to the YMCK data. A recognizing section recognizes a color rendering range for the L*a*b* data and a color rendering range available with the image outputting section. A storage stores data representative of a color rendering range particular to the image inputting section and the color rendering range available with the image outputting section, and supplies the recognizing section with the data. Image data unable to be rendered by the color space of the image outputting section are subjected to color correction and represented in the color space of the image inputting section in a false manner.

BRIEF DESCRIPTION OF THE DRAWINGS

The above and other objects, features and advantages of the present invention will become more apparent from the following detailed description taken with the accompanying drawings in which:

FIGS. 5A and 5B are representative of a procedure to be executed by an L*a*b* converting section also included in the embodiment;

FIG. 7 shows a specific format in which data are stored in a color space difference data storage also included in the embodiment;

FIG. 11 demonstrates the operation of an undercolor removing section also included in the embodiment;

FIGS. 15A and 15B show the color spaces of hue and saturation associated with a certain lightness value;

FIG. 20 shows dither patterns to appear when lightness is changed from a point D to a point C shown in FIG. 19;

DESCRIPTION OF THE PREFERRED EMBODIMENTS

Figure 24:
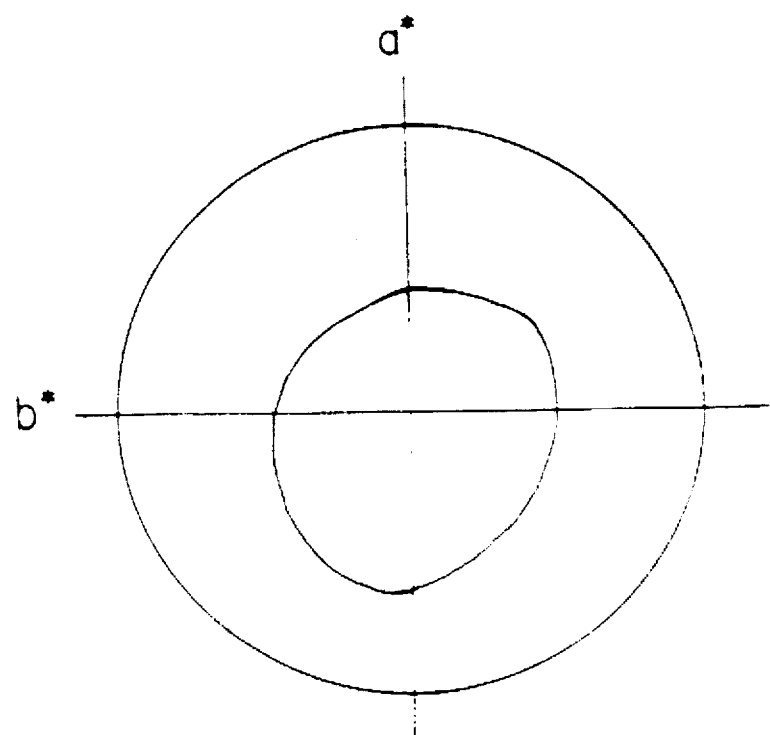
FIG. 24 shows a color space reproducible with image inputting means.
Figure 25A:
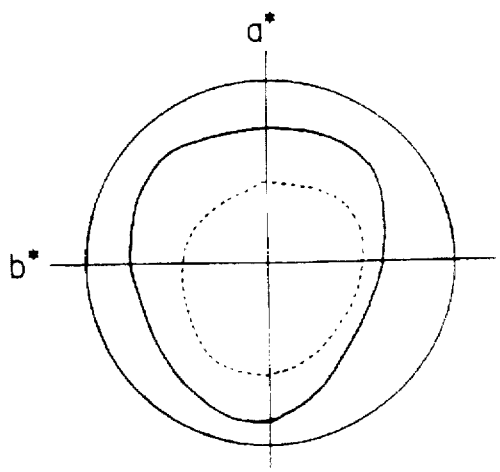
FIGS. 25A–25C show specific color spaces reproducible with image outputting means in relation to the color space of FIG. 24.
Figure 25B:
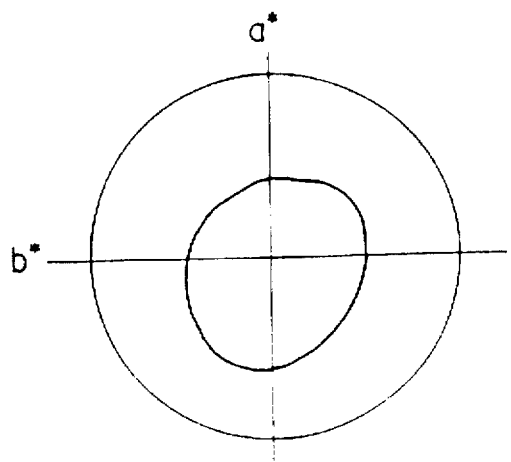
Figure 25C:
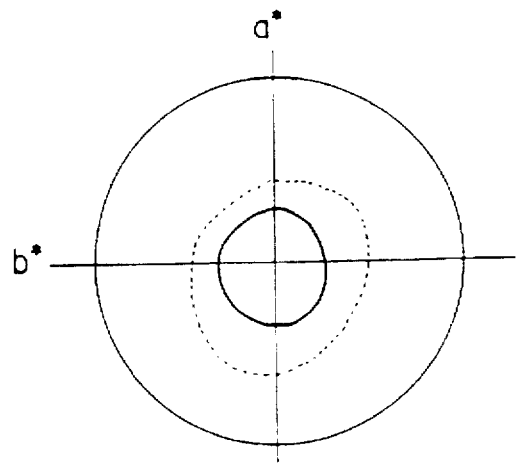

FIG. 24 shows a specific reproducible color space available with image inputting means. FIGS. 25A–25C each shows a specific reproducible color space available with image outputting means and associated with the color space of FIG. 24. As shown, the image outputting means has a color space of FIG. 25A when an output image is greater in color reproduction range than an input image, or a color space of FIG. 25B when the former is the same as the latter, or a color space of FIG. 25C when the former is smaller than the latter. It has been customary with a color image forming apparatus to compress the color reproduction range both when the output image has the same color reproduction range as the input image and when the former has a greater color reproduction range than the latter, as stated earlier. As a result, the reproduced image loses the tonality balance of the original image or suffers from discontinuous low tonality.

Figure 1B:
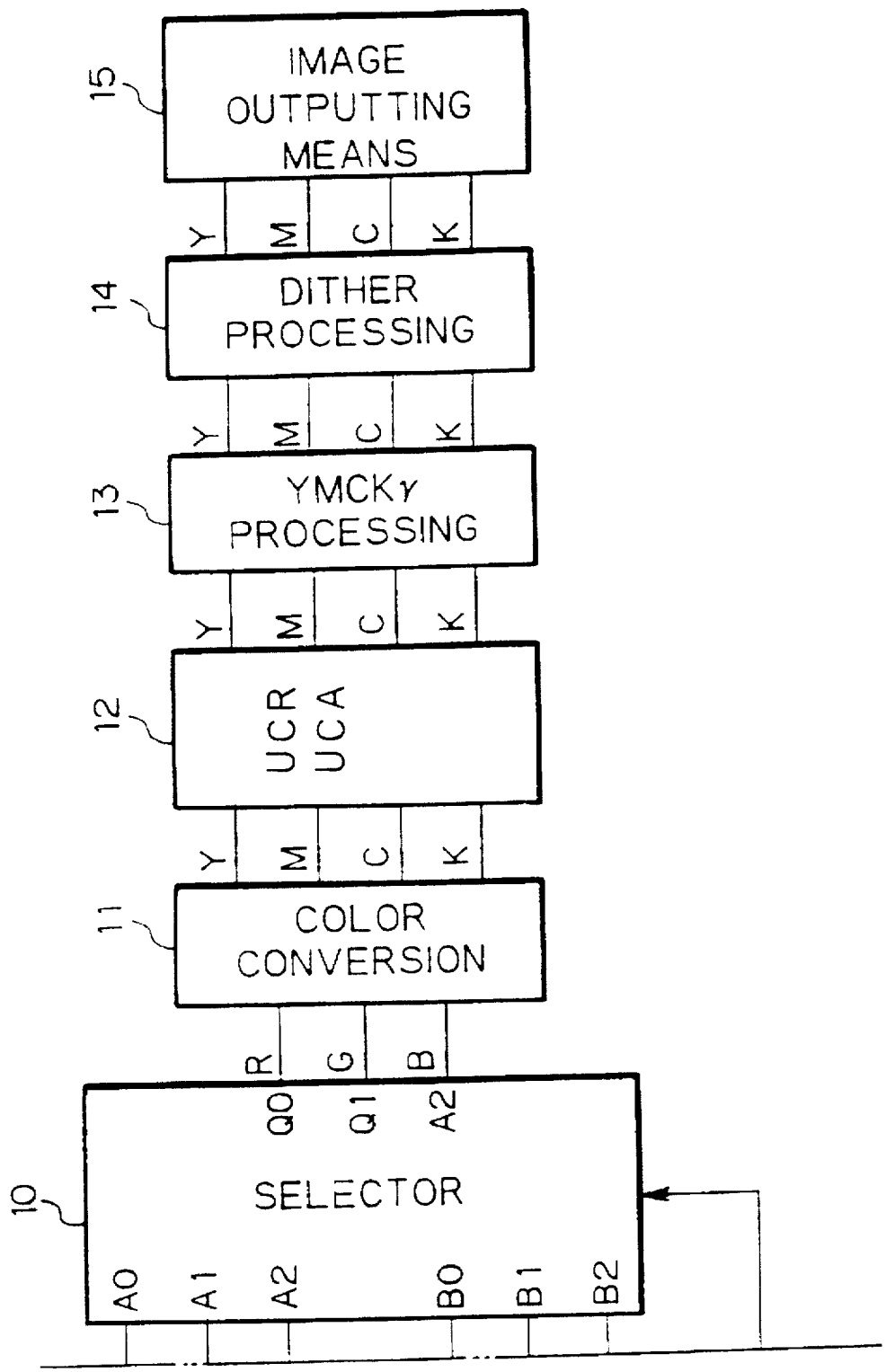
FIG. 1 is a block diagram schematically showing a color image forming apparatus embodying the present invention.
Figure 3:
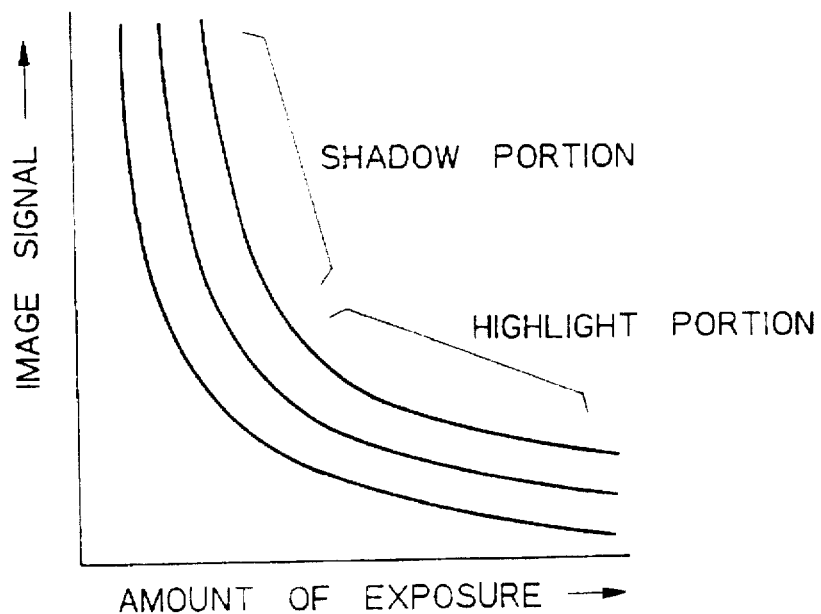
FIG. 3 shows RGBγ curves particular to an RGBγ processing section included in the embodiment.

Referring to FIG. 1, a color image forming apparatus embodying the present invention is shown and includes image inputting means 1. The image inputting means 1 reads a color image and generates an RGB signal representative of the color image. In the embodiment, the image inputting means 1 is implemented by a scanner having a color CCD image sensor or similar imaging device. The image inputting means 1 additionally includes an amplifier for amplifying the image signal to a predetermined level, a shading correction circuit, a density setting circuit, an analog-to-digital converter for converting the image signals to a digital signal, etc., although not shown in the figure. The inputting means 1 is connected to a magnification change 2 which controls a magnification change in the main scanning direction and the position where main scanning starts. To change the magnification, the magnification change 2 transforms ten pixels of image signals from the CCD image sensor to a particular number of pixels of image signals matching a magnification change ratio, and then writes them at the same pitch as in a 1:1 magnification mode. The magnification change 2 is connected to an RGBγ processing 3. Generally, the image signal generated by the CCD image sensor involves scattering with respect to the amounts of R, G and B exposure, i.e., they fail to attain a gray balance. In light of this, as shown in FIG. 3, the RGBγ processing 3 divides R, G and B gamma curves into a shadow portion and a highlight portion and adjusts them independently of each other.

Figure 4:
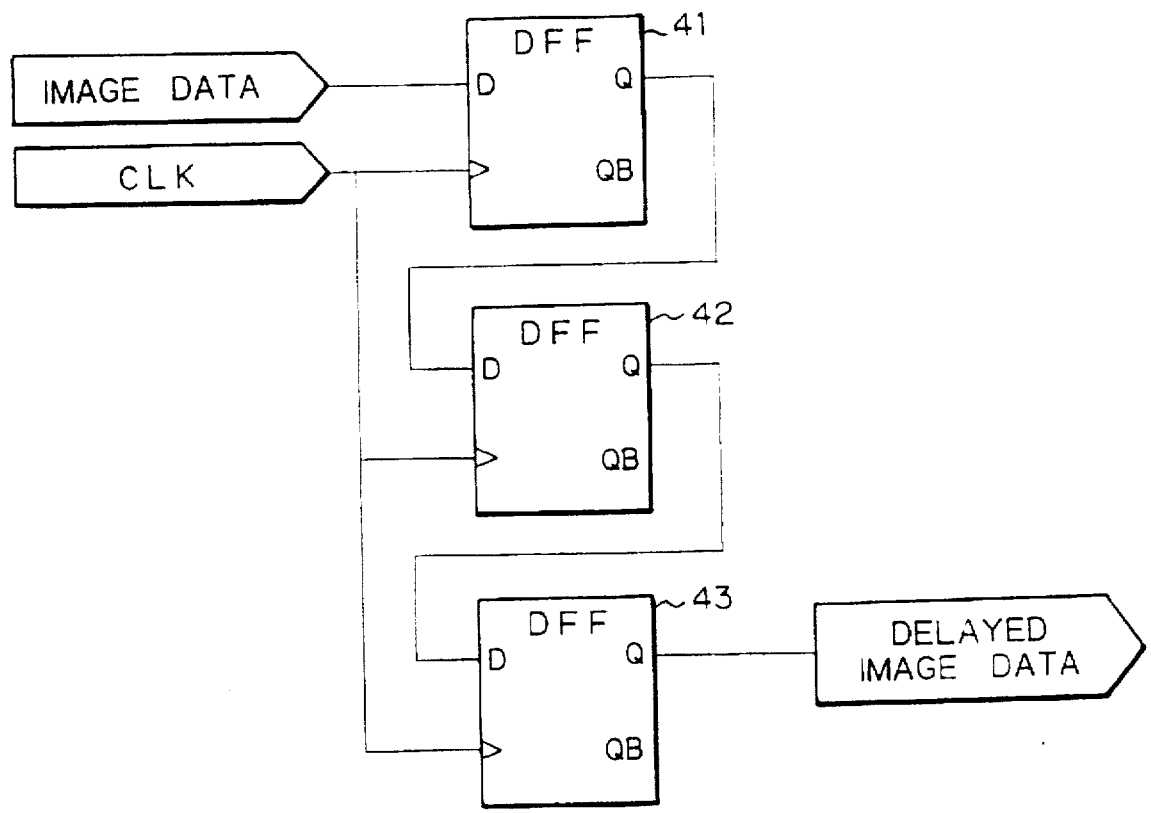
FIG. 4 is a block diagram schematically showing the arrangement of a delay section also included in the embodiment.

The RGBγ processing 3 is connected to a delay processing 4. The delay processing 4 synchronizes the output of the processing 3 to image data dealt with in an L*a*b* conversion section which will be described later. As shown in FIG. 4, the delay processing 4 has three D flip-flops (DFFs) 41, 42 and 43 connected in series and thereby delays the input image signal by three pixel clock pulses.

The RGBγ processing 3 is connected to an L*a*b conversion 5 which converts the RGB image data to L*a*b* image data. Specifically, the conversion 5 transforms the RGB image data to an XYZ color space, as shown in FIG. 5A, and then transforms the XYZ color space to L*a*b* image data, as shown in FIG. 5B. The transform of the RGB color space to the L*a*b* color space is effected because the latter is easier to handle than the former as to the recognition of the lightness, saturation, and hue of the color space of input image data. Specifically, because L* is directly representative of lightness, addition suffices alone, i.e., subtraction is not necessary. As a result, the construction and processing are simplified.

The L*a*b* conversion 5 is connected to an image processing 6 and a difference recognition 8. The image processing 6 processes the image data in the L*a*b* color space and is connected to an RGB conversion 7. The RGB conversion 7 reconverts the L*a*b* image data to the RGB color space. The difference recognition 8 recognizes a difference between the color space of the image inputting means, i.e., the color space capable of being rendered by the scanner and the color space of image outputting means, i.e., the color space capable being rendered by a printer. A data storage 9 is connected to the difference recognition 8 and stores color space difference data which will be described later.

Figure 6A:
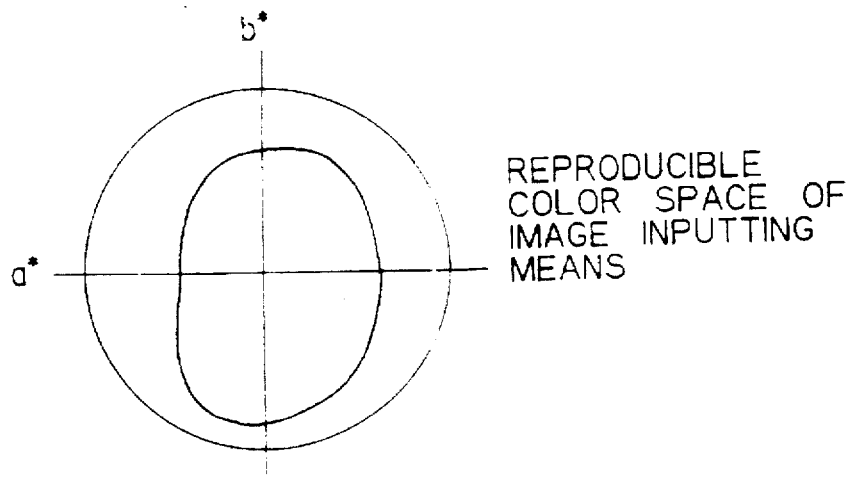
FIGS. 6A–6C show specific maximum color spaces capable of rendering input data with an L*a*b* system.
Figure 6B:
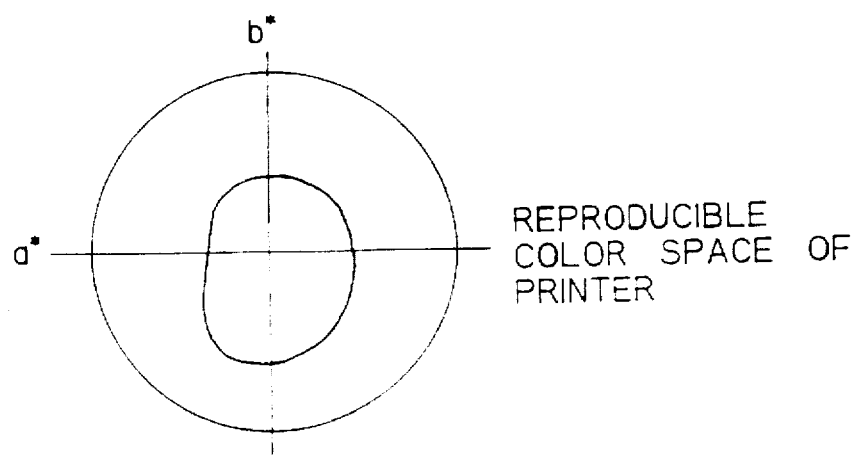
Figure 6C:
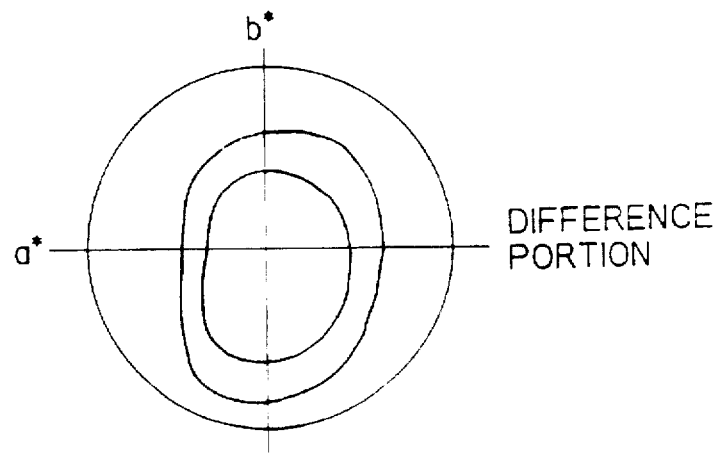

Assume that the input data of the image inputting means can render the maximum color space shown in FIG. 6A and represented by the L*a*b* system, and that the output data of the image outputting means can render the maximum color space shown in FIG. 6B. Then, the outputting means cannot output input image data shown in FIG. 6C. In the illustrative embodiment, the region which the outputting means cannot output is recognized. The input image data from the inputting means and lying in the region which the outputting means can render are directly output by the outputting means. Only the input image data lying in the area which the outputting means cannot render are processed. As a result, the image data from the inputting means are represented in the outputting means in such a manner as to be protected from deterioration due to compression as far as possible.

How the embodiment recognizes the difference between the above two color spaces. The spaces capable of being rendered by the image inputting means and image outputting means, respectively, can be determined by actual measurement on the basis of the characteristics of the respective means. These spaces are represented by L* (lightness) and a*b* (hue and saturation). Then, the values of the maximum color spaces available with the inputting and outputting means are each represented by b* for particular L* and a* and stored in the data storage 9. The data storage 9 should advantageously be implemented by a semiconductor memory (RAM or ROM) accessible at high speed, particularly a removable IC card.

Figures 8A, 8B:
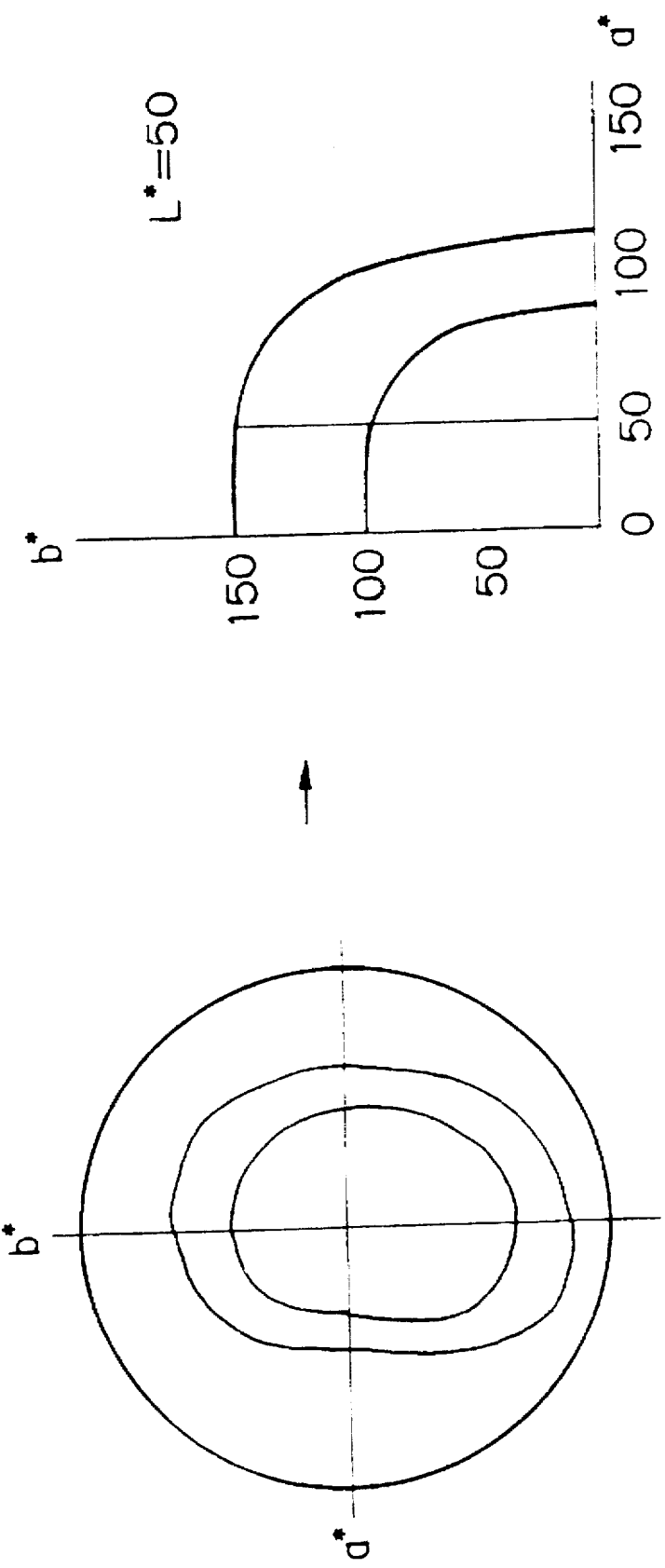
FIG. 8 shows a difference between a specific reproducible color space of image inputting means and that of image outputting means.

The data of each color reproduction space are stored in the data storage 9, as stated above. The difference recognition 8 reads the color reproduction data out of the data storage 9 and compares them with the input L*a*b* data, thereby determining a difference between the color reproducible range of the inputting and that of the outputting means. FIG. 7 shows a specific format in which the data are stored in the data storage 9. FIG. 8 shows a specific difference between the reproducible color space of the inputting means and that of the outputting means.

Figures 9, 10:
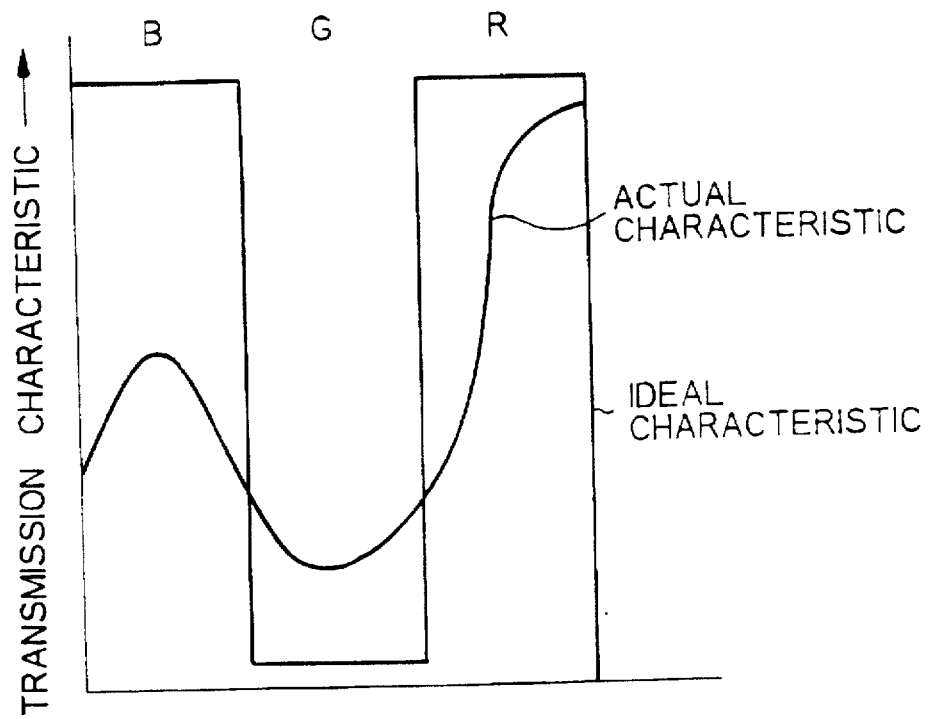
FIG. 9 is indicative of the actual transmission characteristic and the ideal transmission characteristic of toner.
FIG. 10 shows a determinant which a color converting section also included in the embodiment uses to transform RGB signals to color material YMCK signals.

The delay 4 and RGB conversion 7 are connected to a selector 10. The selector 10 selects either the output signal of the delay 4 or that of the RGB conversion 7 in response to a decision signal or switching signal fed from the difference recognition 8. The selector 10 is connected to a color conversion 11. As shown in FIG. 9, the actual transmission characteristic of toner differs from the ideal color transmission characteristic. The color conversion 11 compensates for such a difference by using masking coefficients selected in consideration of the transmission characteristic of toner, and by using a determinant shown in FIG. 10. As a result, the RGB signal is transformed to a color material YMCK (yellow, magenta, cyan and black) signal.

The color conversion 11 is connected to an undercolor removal (UCR) 12. The UCR 12 removes a black toner component from yellow, magenta, and cyan. The removal ratio is, in many cases, less than 100% because recording the entire common portions with black toner results in a granular image lacking smoothness. Further, simply replacing yellow toner, magenta toner and cyan toner with black toner results in a flat image. In light of this, the UCR 12 adds predetermined amounts of yellow toner, magenta toner, and cyan toner.

Figure 12:
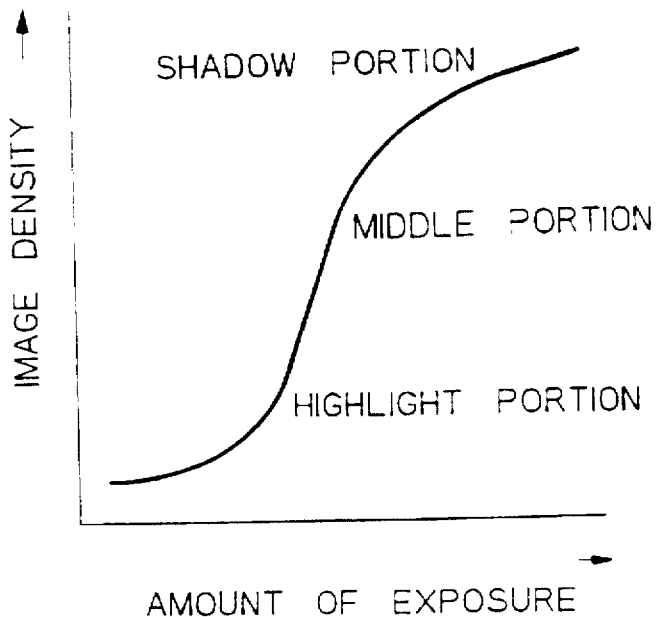
FIG. 12 shows a YMCKγ curve particular to a YMCKγ processing section also included in the embodiment.
Figure 13A:
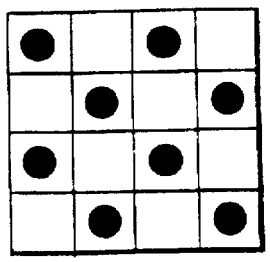
FIGS. 13A–13D show specific dither matrixes which a dither processing section also included in the embodiment uses.
Figure 13B:
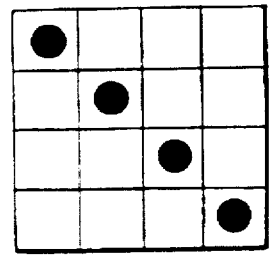
Figure 13C:
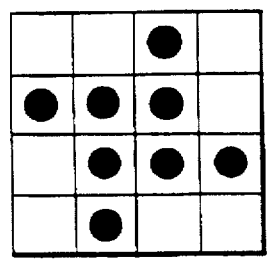
Figure 13D:
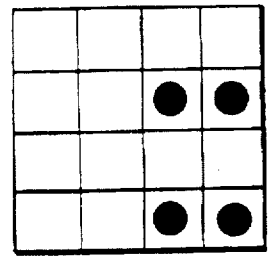

The UCR 12 is connected to a YMCKγ processing 13. The YMCKγ processing 13 corrects the relation between the image density and the amount of exposure; otherwise, the image density would not be linearly proportional to the amount of exposure, as shown in FIG. 12.

The YMCKγ processing 13 is connected to a dither processing 14. The dither processing 14 uses 4×4 matrixes in which threshold levels are set in accordance with a given rule. With such matrixes, the dither processing 14 binarizes the image data and render halftone on the basis of illusion. Specific dither matrixes are shown in FIGS. 13A–13D. The matrix of FIG. 13A has a high dot density and enhances the reproducibility of characters, among others. The matrix of FIG. 13B has dots concentrating in the 45° direction and enhances the reproducibility in a character/photograph mode, among others. The matrix of FIG. 13C has dots positioned close to each other and enhances the reproducibility of a photograph, among others. Further, the matrix of FIG. 13D has dots concentrating in the 90° direction and enhances the reproducibility in the character/photograph mode, among others.

Figure 14:
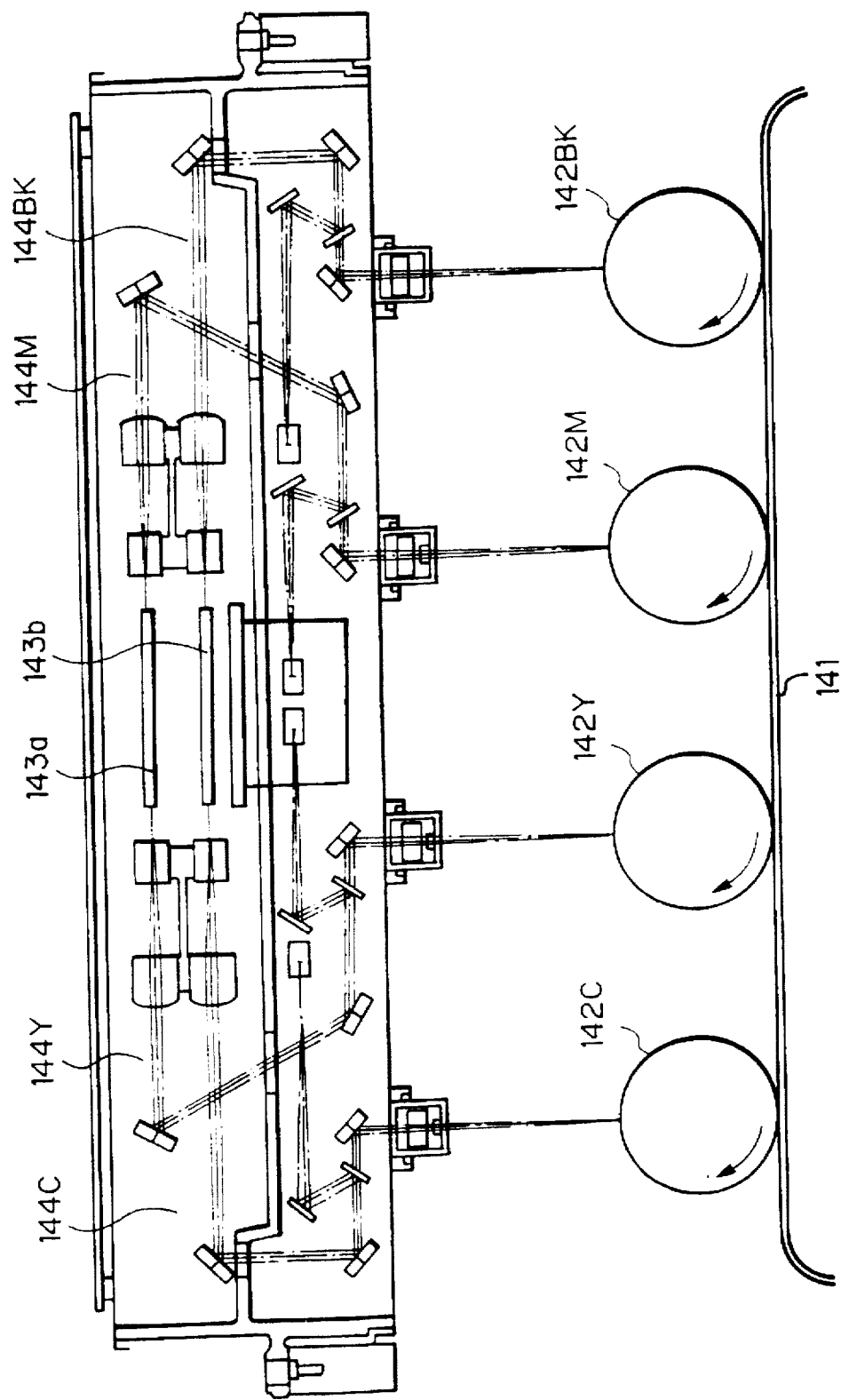
FIG. 14 shows a writing system included in an electrophotographic color printer which is a specific form of the image outputting means of the embodiment.

The dither processing 14 is connected to image outputting means 15 which may be implemented as an electrophotographic color printer using Y, M, C and K toner. As shown in FIG. 14, the color printer has a transfer belt 141, and drums 142C, 142Y, 142M and 142Bk (black). Images of different colors are transferred from the respective drums 142C–142Bk to the belt 141 to turn out a composite color image. The color image is transferred from the belt 141 to a paper. Specifically, polygonal mirrors 143a and 143b are arranged one above the other. An image read out of a document is routed through the polygonal mirrors 143a and 143b and writing optics 144C, 144Y, 144M and 144Bk and written to the drums 142C, 142Y, 142M and 142Bk. Development, image transfer, cleaning and other conventional electrophotographic steps are executed with each of the images.

Figure 2B:
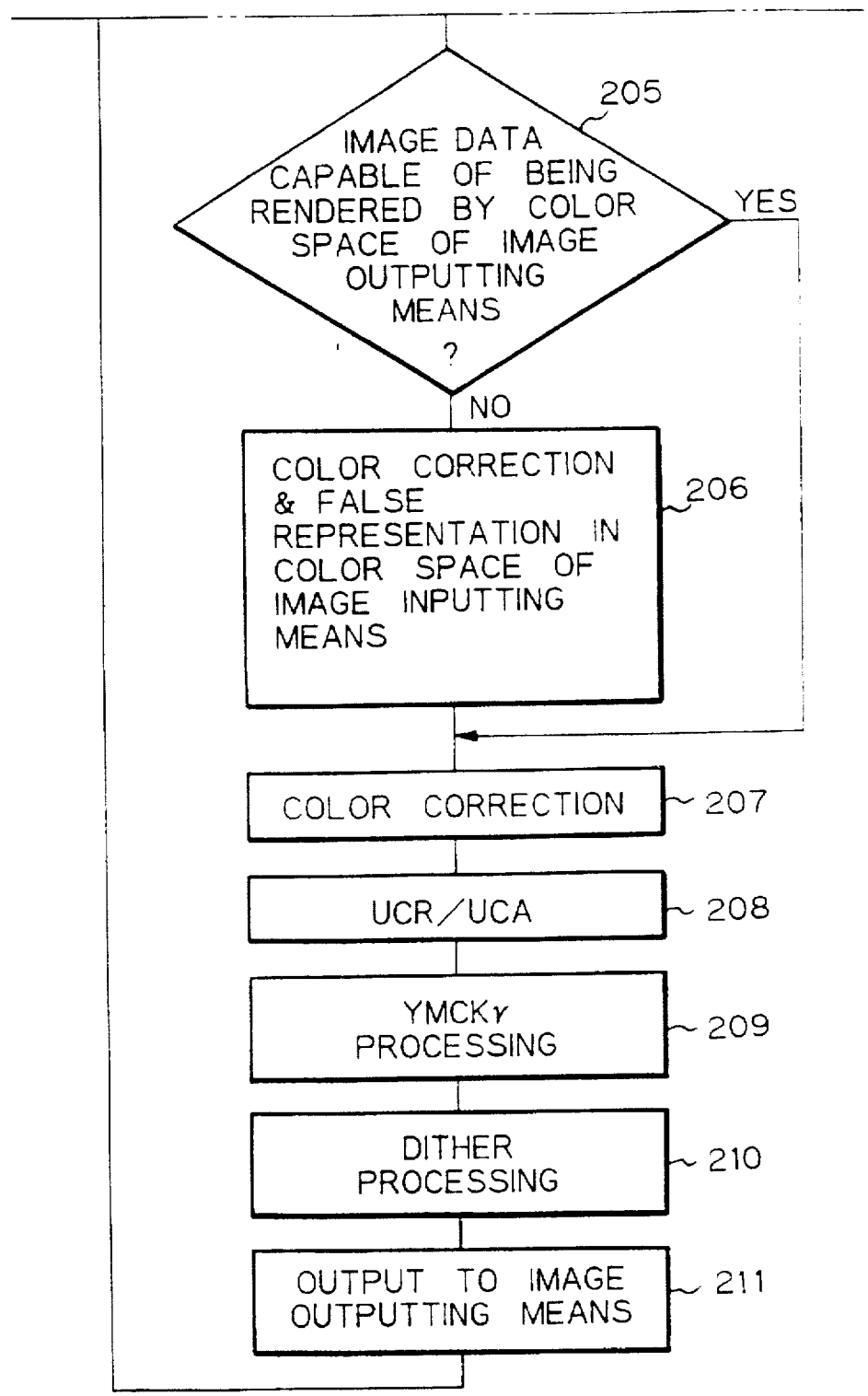
FIG. 2 is a flowchart demonstrating a specific operation of the embodiment.

A reference will be made to FIG. 2 for describing the procedure for processing the image data by way of the L*a*b* system. First, whether or not image data have ended is determined (step 201). If the answer of the step 201 is negative (NO), then the image inputting means 1 reads image data (step 202). Subsequently, the magnification change 2 changes the magnification (step 203). Further, the RGBγ processing 3 executes RGBγ processing with the image data (step 204) and delivers the result to the delay 4 and L*a*b* conversion 5. The difference recognition 8 determines whether or not the image data represented by the output of the L*a*b* conversion 5 can be rendered by the color space available with the image outputting means (step 205). If the answer of the step 205 is NO, color correction is executed to represent the image data in the color space of the image inputting means in a false manner (step 206). At this instant, the recognition 8 sends a decision signal to the selector 10 so as to cause it to select the RGB conversion 7. If the answer of the step 205 is YES, the selector 10 selects the delay 4. This is followed by a step 207 in which the color conversion 11 executes color correction. This is also executed with the result of the step 206.

Subsequently, there are sequentially executed UCR by the UCR 12 (step 208), YMCKγ processing by the YMCKγ processing 13 (step 209), and dither processing by the dither processing 14.

Hereinafter will be described a procedure for varying the lightness and saturation of the difference portion between the color reproduction ranges particular to the image inputting means and image outputting means. This procedure is effected to generate an output image which is a representation in the color reproduction range of the inputting means.

Figure 16:
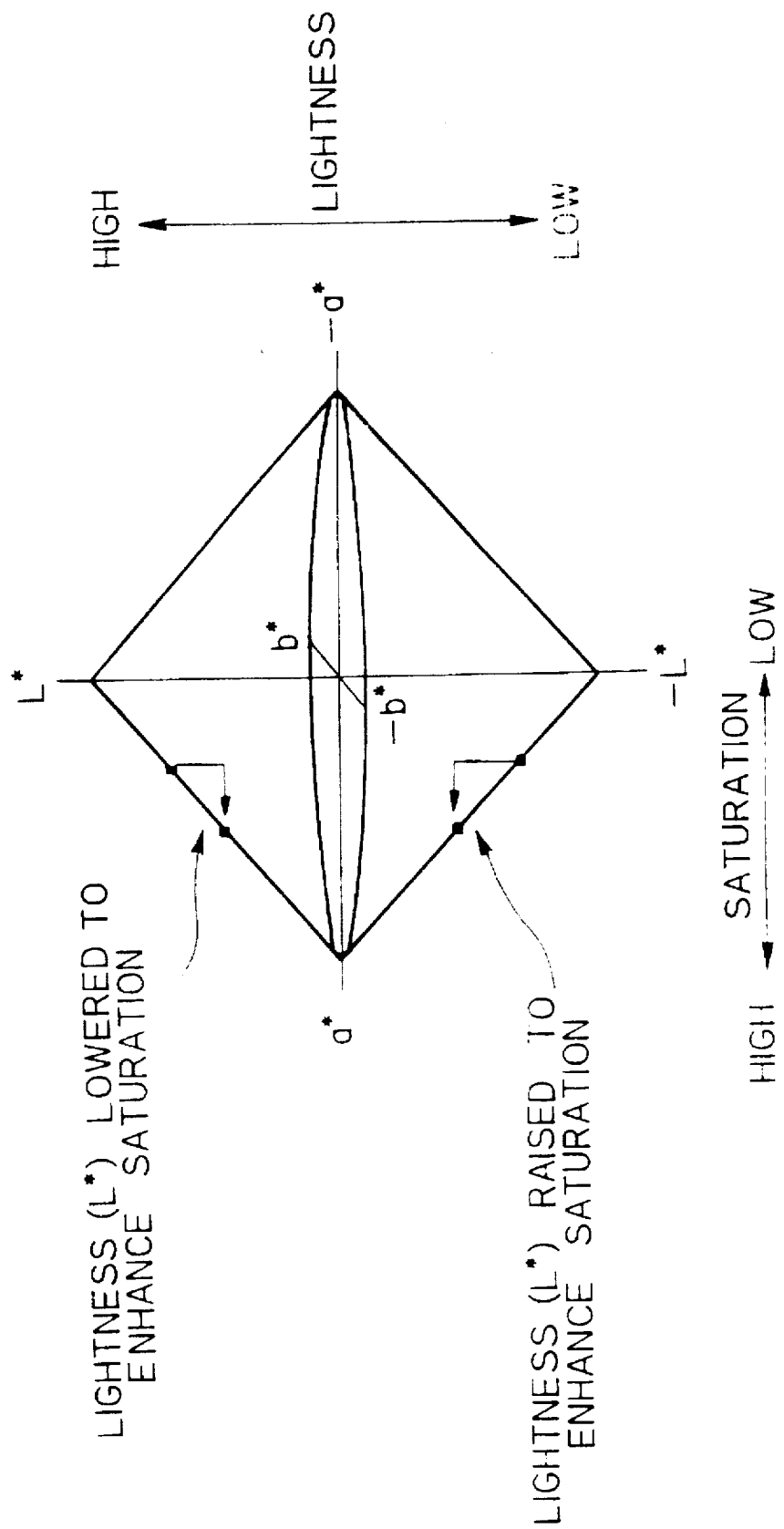
FIG. 16 shows how saturation changes with a change in lightness.

FIG. 15A shows the color space of the image inputting means and that of the image outputting means in terms of saturation and hue (a*b*) associated with certain lightness (L*). FIG. 15B shows the two color spaces as viewed sideways. As shown, the color reproduction range available with the image outputting means is narrower than the range available with the image inputting means. Then, it naturally occurs that the image data read by the inputting means cannot be rendered by the outputting means. In FIG. 15B, the inputting means can render saturation for certain lightness and hue over a range extending from a point A to a point B. However, the outputting means can render saturation for the same lightness and hue only over a range extending from a point C to a point D and narrower than the range A–B. In this condition, by lowering the lightness (point D) of the outputting means to a point F, it is possible to increase the saturation from the point C to a point E. That is, the saturation can be improved (increased) if the lightness (L*) is increased or decreased, as shown in FIG. 16.

Figure 17:
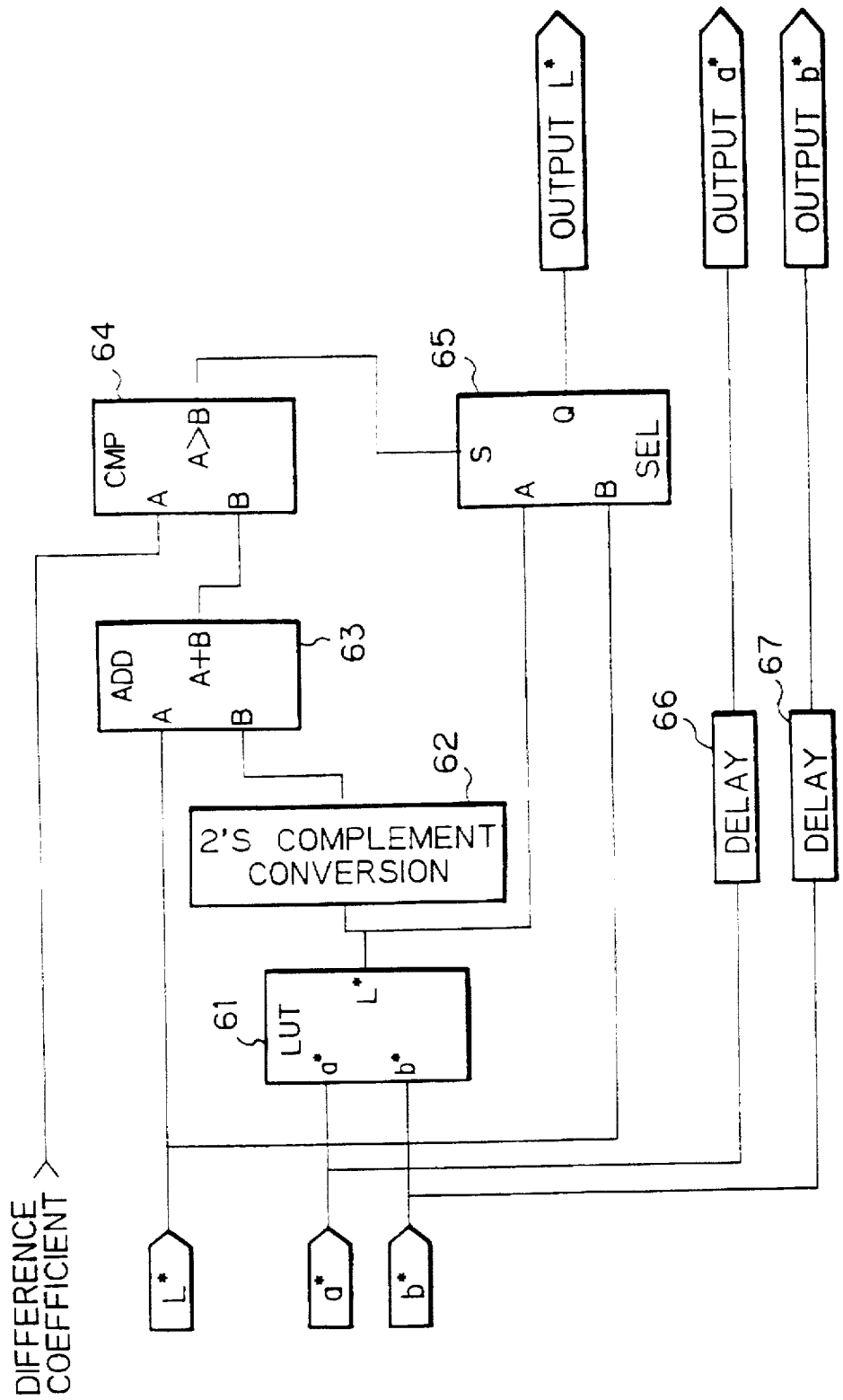
FIG. 17 is a block diagram schematically showing an image processing section further included in the embodiment.

FIG. 17 shows the construction of the image processing 6 for implementing the above procedure. As shown, a 2's complement conversion 62 is connected to a look-up table (LUT) 61 to which signals a* and b* are input. The output of the 2's complement conversion 62 and a signal L* are input to an adder (ADD) 63. The output of the adder 63 is connected to one input of a comparator (CMP) 64. A difference coefficient is applied to the other input of the comparator 64. A selector (SEL) 65 receives the output signal of the LUT 61, the signal L*, and the output signal of the comparator 64, i.e., a switching signal S. Delays 66 and 67 delay the signals a* and b*, respectively.

In operation, the data (a* and b*) from the image inputting means are applied to the LUT 61. In response, the LUT 61 produces lightness (*L) matching the data a* and b*. Specifically, when the input image cannot be confined in the color space of the outputting means, the LUT 61 converts the lightness (*L) to one capable of broadening the saturation and hue rendering range. L* from the LUT 61 is applied to the adder 63. The adder 63 produces a difference between the data L* from the LUT 61 and the original data L*.

The comparator 64 compares the difference from the adder 63 with the difference coefficient. The comparator 64 causes the selector 65 to select the converted L* if the output of the adder 63 is smaller than the coefficient, or to select the original L* if the former is greater than the latter. This successfully prevents the color balance from being lost due to excessive changes in lightness caused by the LUT conversion. Because the color reproduction range is broadened by the conversion of the lightness (L*), the input data a* and b* are output in synchronism with the lightness (L*) and successfully reproduced by the outputting means.

While the circuitry of FIG. 17 is capable of broadening the saturation rendering range for a given hue, it has a problem that the color balance is lost when the lightness is noticeably changed. An alternative embodiment to be described allows the saturation rendering range for a given hue to be broadened even when the lightness is noticeably changed.

The alternative embodiment is based on the fact that even if the lightness of the original image data is changed to a certain degree, it can be restored to the original image data when the image is grasped in its entirety by areal tonality processing. Specifically, the embodiment recognizes the difference portion between the inputting means and the outputting means, and executes, when color data unable to be rendered by the outputting means are input, processing for changing the lightness so as to enhance the saturation. Further, the embodiment recognizes the amount of change of the lightness and whether the lightness is increased or decreased, and then adds a particular dither pattern matching the degree of change of the lightness to the image data. Specifically, when the lightness is changed from the point D to the point F as shown in FIGS. 15A and 15B, the embodiment adds a dither pattern matching such a change to the image data whose lightness has been changed.

Figure 18:
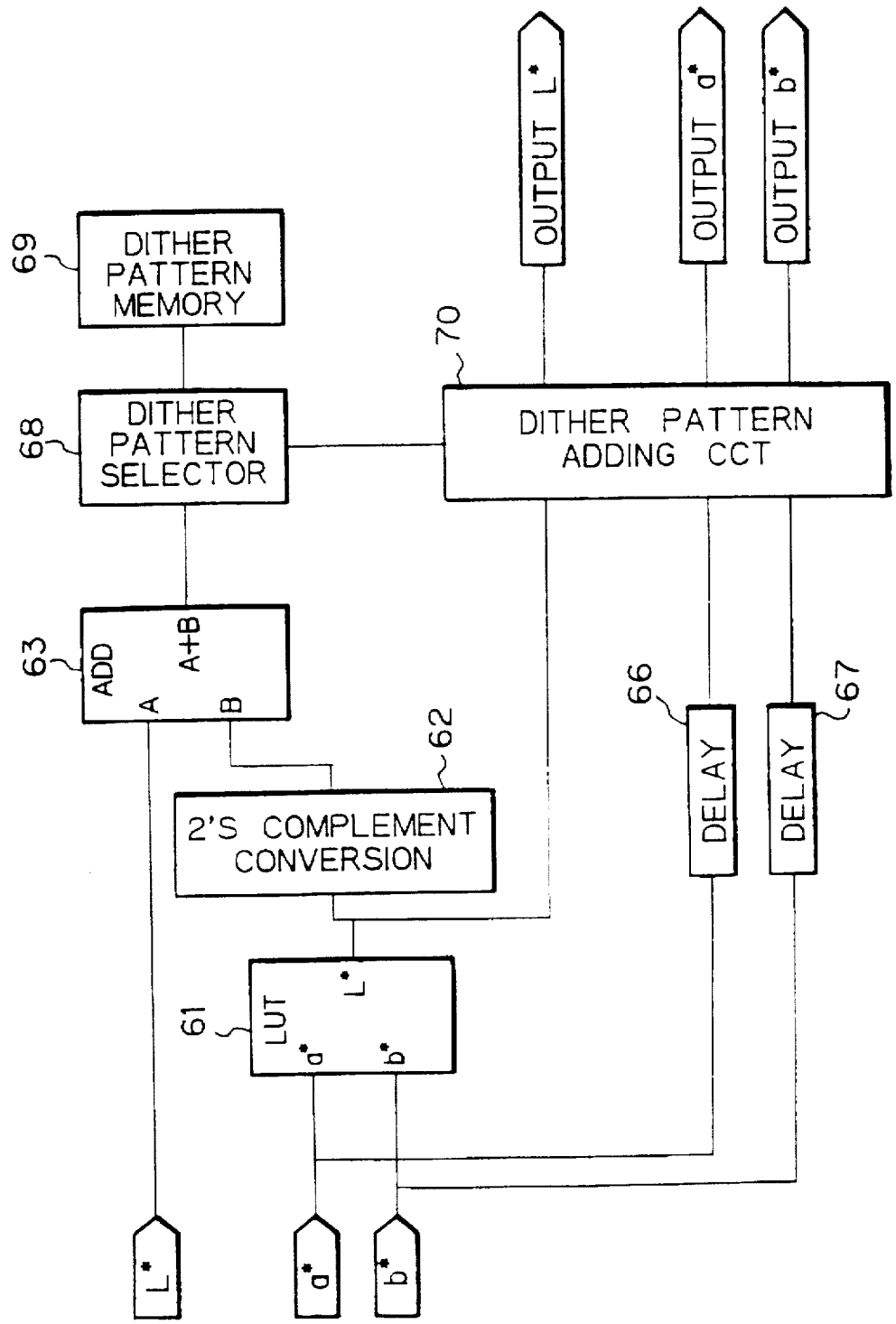
FIG. 18 is a block diagram schematically showing another specific configuration of the image processing section.

FIG. 18 shows circuitry for executing the above procedure of the alternative embodiment. In FIG. 18, the same or similar constituents as or to the constituents of FIG. 17 are designated by the same reference numerals, and a detailed description thereof will not be made in order to avoid redundancy. As shown, a dither pattern selector 68 is connected to the adder 63 while a dither pattern memory 69 is connected to the selector 68. A dither pattern adding circuit 70 is connected to the outputs of the LUT 61 and delays 66 and 67. The circuit 70 outputs L*, a* and b*.

The operation of the circuitry shown in FIG. 18 is as follows. The LUT 61 outputs a lightness value (L*) in response to data (a* and b*) input from the image inputting means. Specifically, when the input image cannot be confined in the color space of the outputting means, the LUT 61 converts the lightness (*L)to one capable of broadening the saturation and hue rendering range. L* from the LUT 61 is applied to the adder 63. The adder 63 produces a difference between the converted L* from the LUT 61 and the original L*.

The dither pattern selector 68 selects, among the dither patterns stored in the memory 69, the pattern matching the output of the adder 63. The dither pattern is fed from the selector 68 to the dither pattern adding circuit 70. The circuit 70 adds the dither pattern to the data a* and b* and the data L* output from the LUT 61, thereby outputting L*, a* and b*.

Figure 19:
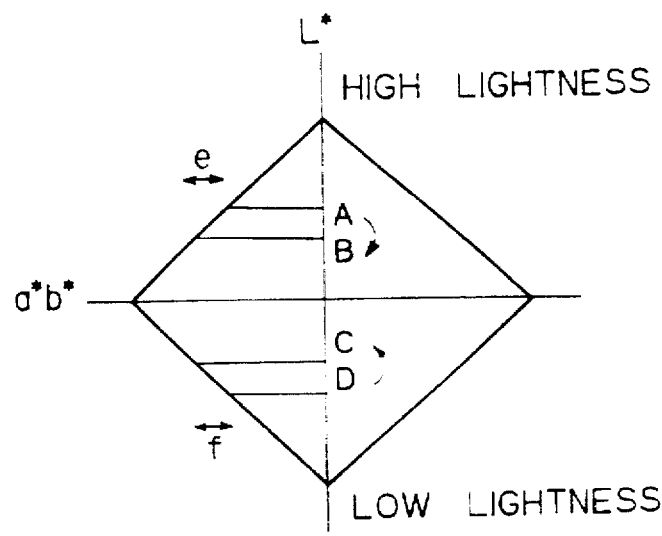
FIG. 19 shows a specific L*a*b* color space for describing how lightness is changed.

The dither patterns will be described hereinafter, taking 5×5 matrices as an example. As shown in FIG. 19, when the lightness is increased or when it is decreased, a particular dither pattern is selected in matching relation to the increment or decrement of the lightness. When the lightness is changed from a point A to a point B, the lightness is lowered to broaden the saturation rendering range by a width e. Because the lightness is lowered, a dither pattern which will increase the lightness is added to the image data. In this manner, a particular dither pattern matching the difference between the points A and B is selected.

FIG. 20 shows specific dither patterns (I)–(III) usable when the lightness is changed from the point A to the point B of FIG. 19. The patterns (I), (II) and (III) are respectively assigned to the smallest difference, the medium difference, and the greatest difference between the points A and B. That is, the patterns (I)–(III) are used when the lightness is sequentially lowered. To compensate for the lightness conversion, the patterns are so designed as to sequentially increase the lightness beforehand. On the other hand, when the lightness is changed from a point D to a point C shown in FIG. 19, dither patterns (IV)–(VI) also shown in FIG. 20 are usable. In this case, the lightness is increased to broaden the saturation rendering range by a width f. Because the lightness if increased, a dither pattern which will lower the lightness is added to the image data. That is, the patterns (IV)–(VI) are used when the lightness is sequentially raised. To compensate for the lightness conversion, the patterns are so designed as to sequentially lower the lightness.

Figure 21:
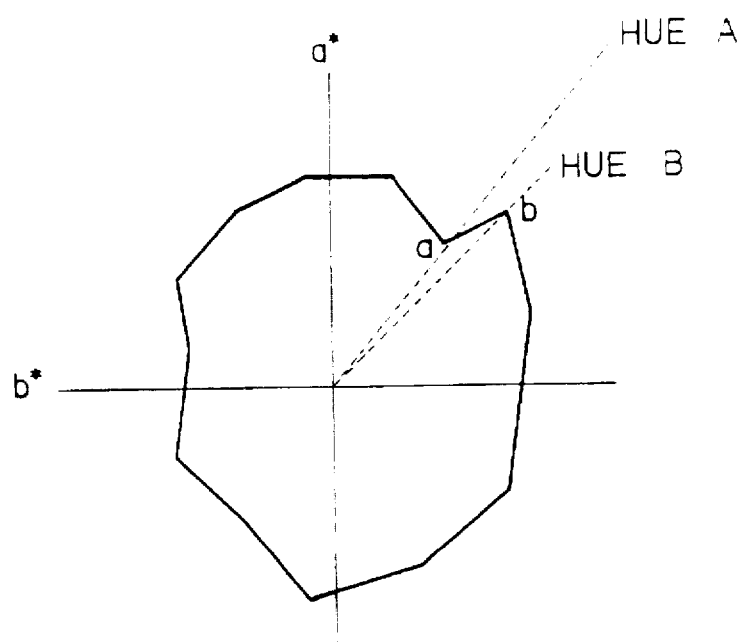
FIG. 21 shows the color reproducible range of hue and saturation associated with a certain lightness.

Another alternative embodiment of the present invention will be described which is capable of broadening the color rendering range of the outputting means while changing the color balance little for a certain hue. The processing to be described is executed by the image processing 6. The processing is characterized in that saturation and hue rendering ranges respectively corresponding to the lightness values of the outputting means are stored in a memory, and in that the hue of the input data is converted to a degree which does not affect the tone, thereby increasing the saturation held in a saturated state. Specifically, as shown in FIG. 21, saturation and hue data each matching a particular lightness value of the outputting means are stored. For image data having a hue value A, the color rendering range is only up to a saturation value a. However, by replacing the hue A with hue B which does not affect the tone, it is possible to extend the color reproducible saturation to a saturation b.

Figure 22:
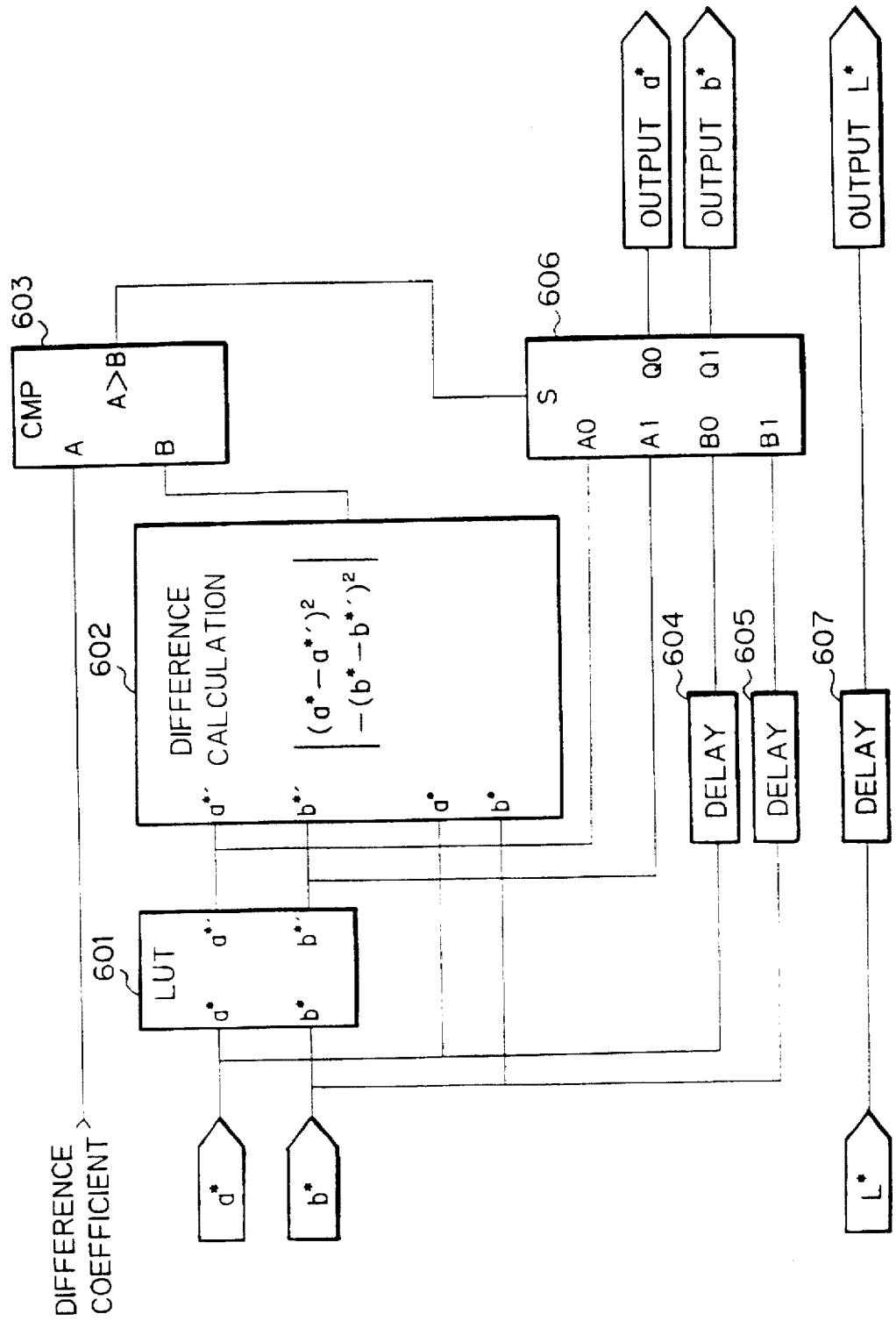
FIG. 22 is a block diagram schematically showing still another specific configuration of the image processing section.

FIG. 22 shows circuitry for executing the above procedure. As shown, an LUT 601 receives the signals a* and b*. A difference calculation 602 is connected to the LUT 601 and calculates a color difference on the basis of a* and b* and a*' and b*' output from the LUT 601, i.e., (a*–a*')2– (b*–b*')2. A comparator 603 is connected to the calculation 602 and compares the output signal of the comparator 603 with a color difference coefficient also input thereto. The comparator 603 produces a signal S representative of the result of comparison. Delays 604 and 605 delay the signals a* and b*, respectively. A selector 606 is connected to the outputs of the delays 604 and 605 and LUT 601. The output signal, or switching signal, S of the comparator 603 is fed to a terminal S included in the selector 606. Further, a delay 607 delays the signal L*.

In operation, the LUT 601 outputs a*' and b*' by converting the data a* and b* input from the inputting means. Specifically, when the input image cannot be confined in the color space of the outputting means, the LUT 61 converts the hue to one capable of broadening the saturation rendering range. The difference calculation 602 produces a difference between the converted a*' and b*' and the original a* and b*. The comparator 603 compares the output of the calculation 602 with the color difference coefficient. If the former is greater than the latter, the original a* and b* are output. This prevents the color balance from being lost due to the excessive changes of hue and saturation. While originally the input data a* and b* cannot be rendered by the outputting means, the above hue conversion broadens the reproducible range. The data a* and b* are output from the selector 602 in synchronism with the data L*.

Figure 23B:
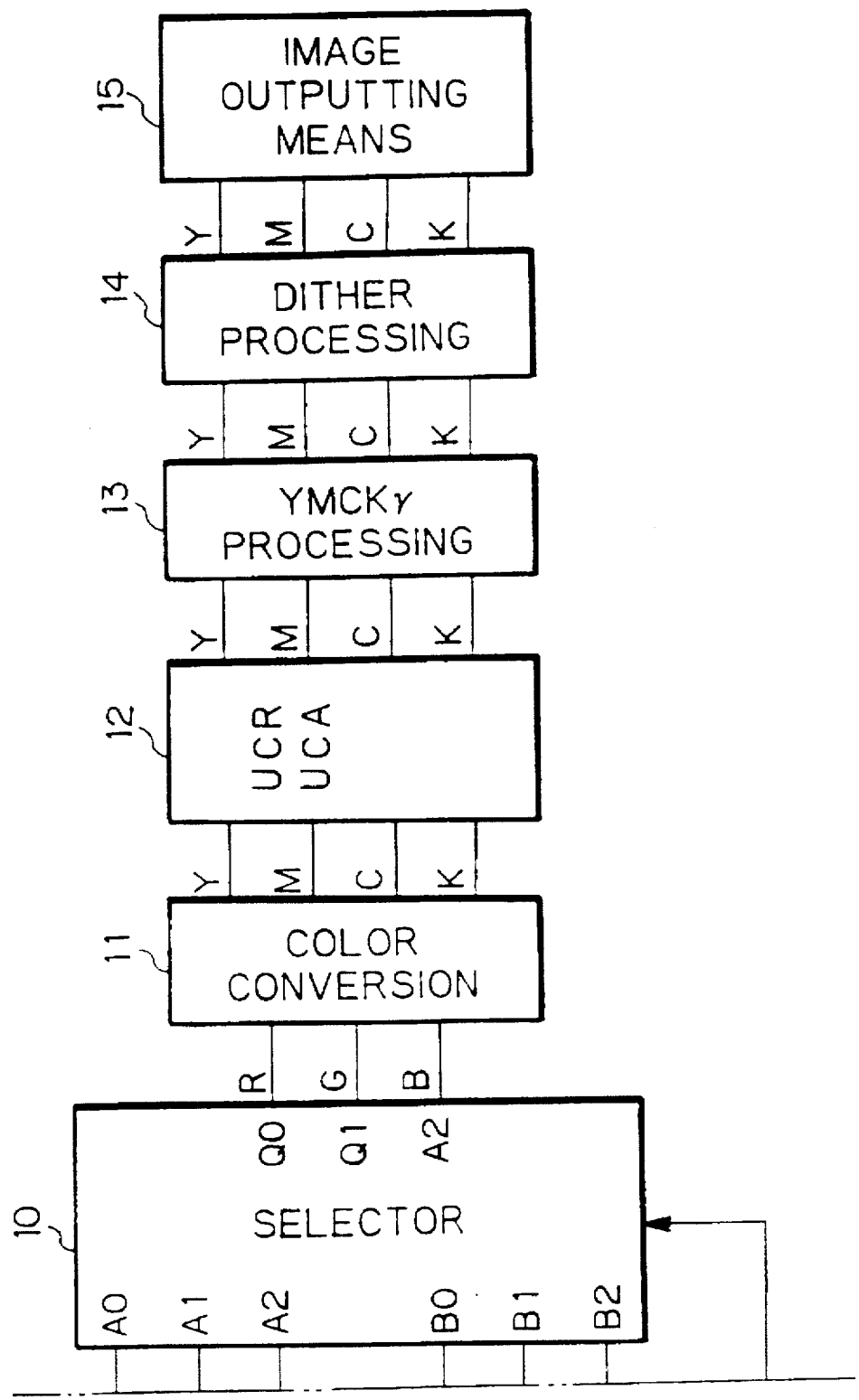
FIG. 23 is a block diagram schematically showing an alternative embodiment of the present invention.

Referring to FIG. 23, a further alternative embodiment of the present invention will be described. In FIG. 23, the same or similar constituents as or to the constituents of FIG. 1 are designated by the same reference numerals, and a detailed description thereof will not be made in order to avoid redundancy. As shown, this embodiment has, in place of the data storage 9, data storages 16 and 17 assigned to the image inputting means and image outputting means, respectively. The data storages 16 and 17 may each be implemented by a nonvolatile memory. The data storages 16 and 17 respectively store the color reproduction range of the inputting means 1 and that of the outputting means 15. When the inputting means 1 and/or the outputting means 15 are replaced, the data storage 16 and/or the data storage 17 is replaced at the same time. Therefore, the data storages 16 and 17 should preferably be implemented as a removable nonvolatile memory unit 19.

In summary, it will be seen that the present invention provides a color image forming apparatus capable of protecting tonality from deterioration, outputting an image close to an original image, and recognizing a difference portion between color reproduction ranges with accuracy.

Various modifications will become possible for those skilled in the art after receiving the teachings of the present disclosure without departing from the scope thereof.

What is claimed is:

1. A color image forming apparatus comprising:

image inputting means for reading a color document image and generating RGB data representative of said document image;

L*a*b* converting means for converting said RGB data to L*a*b* data;

image processing means for executing image processing with said L*a*b* data;

RGB converting means for converting data output from said image processing means to RGB data;

YMCK processing means for converting said RGB data to YMCK data;

image outputting means for outputting the color document image by sequentially superposing color materials on a paper in response to said YMCK data;

recognizing means for recognizing L*a*b* data outside a color rendering range of said image outputting means;

storing means storing data representative of a color rendering range particular to said image inputting means and said color rendering range available with said image outputting means, and for supplying said recognizing means with said data;

said image processing means including color correction means for performing color correction only on said L*a*b* data outside the color rendering range of said image outputting means to produce corrected L*a*b* image data defining a color within the color rendering range of said image outputting means and outputting the corrected L*a*b* data to said RGB converting means; and a selecting mechanism for selecting one of said RGB data generated by said image inputting means and said RGB data output from said RGB converting means based on a signal from said recognizing means, and providing the selected RGB data to said YMCK processing means.

2. An apparatus as claimed in claim 1, wherein when image data input by said image inputting means, but unable to be reproduced in color by said image outputting means, exist, a lightness value and a saturation value of said image data are changed for said color correction.

3. An apparatus as claimed in claim 1, wherein when image data input by said image inputting means, but unable to be reproduced in color by said image outputting means, exist, a dither pattern of said image data is changed in accordance with a degree of change of lightness of said image data.

4. An apparatus as claimed in claim 1, wherein when image data input by said image inputting means, but unable to be reproduced in color by said image outputting means, exist, a hue value of said image data is changed in order to broaden a color reproducible range.

5. An apparatus as claimed in claim 1, wherein said storing means comprises a removable nonvolatile memory storing range data representative of a color rendering range of said image inputting means and a color rendering range of said image outputting means.

* * * * *